United States Patent
Bierwald

(10) Patent No.: US 11,014,803 B2
(45) Date of Patent: May 25, 2021

(54) CONNECTION SYSTEM FOR CONNECTING LOADS TO A HARNESS

(71) Applicant: Alexander Bierwald, Oberhausen (DE)

(72) Inventor: Alexander Bierwald, Oberhausen (DE)

( * ) Notice: Subject to any disclaimer, the term of this patent is extended or adjusted under 35 U.S.C. 154(b) by 0 days.

(21) Appl. No.: 16/715,923

(22) Filed: Dec. 16, 2019

(65) Prior Publication Data

US 2020/0189906 A1 Jun. 18, 2020

(30) Foreign Application Priority Data

Dec. 17, 2018 (EP) .................................. 18213219

(51) Int. Cl.
*B68B 5/02* (2006.01)

(52) U.S. Cl.
CPC ....................... *B68B 5/02* (2013.01)

(58) Field of Classification Search
CPC ................ B68B 5/02; A01K 27/005
See application file for complete search history.

(56) References Cited

U.S. PATENT DOCUMENTS

| | | | |
|---|---|---|---|
| 2,722,449 A | 11/1955 | Harley | |
| 2,755,043 A * | 7/1956 | Holm | B64D 17/32 244/122 AH |
| 3,074,378 A * | 1/1963 | Clayton | A01K 27/005 119/774 |
| 3,115,321 A * | 12/1963 | Louis | B64D 17/32 244/151 A |
| 3,692,263 A * | 9/1972 | Pravaz | B64D 17/32 244/151 A |
| 3,934,848 A * | 1/1976 | Snyder | B64D 17/32 244/151 A |
| 4,074,396 A * | 2/1978 | Swimley | A44B 9/12 24/709.1 |
| 4,337,913 A * | 7/1982 | Booth | B64D 17/38 24/573.11 |
| 2004/0035897 A1 | 2/2004 | Salentine et al. | |
| 2013/0181083 A1 | 7/2013 | Salentine et al. | |

FOREIGN PATENT DOCUMENTS

GB 814752 A 6/1959

* cited by examiner

*Primary Examiner* — Robert Sandy
*Assistant Examiner* — Louis A Mercado
(74) *Attorney, Agent, or Firm* — Barnes & Thornburg LLP

(57) ABSTRACT

A connection system for connecting and disconnecting loads to a belt harness is disclosed. The connection system according to the present disclosure may permit simplified, fast and safe handling under icing conditions, line of sight obstruction and/or with gloves.

15 Claims, 2 Drawing Sheets

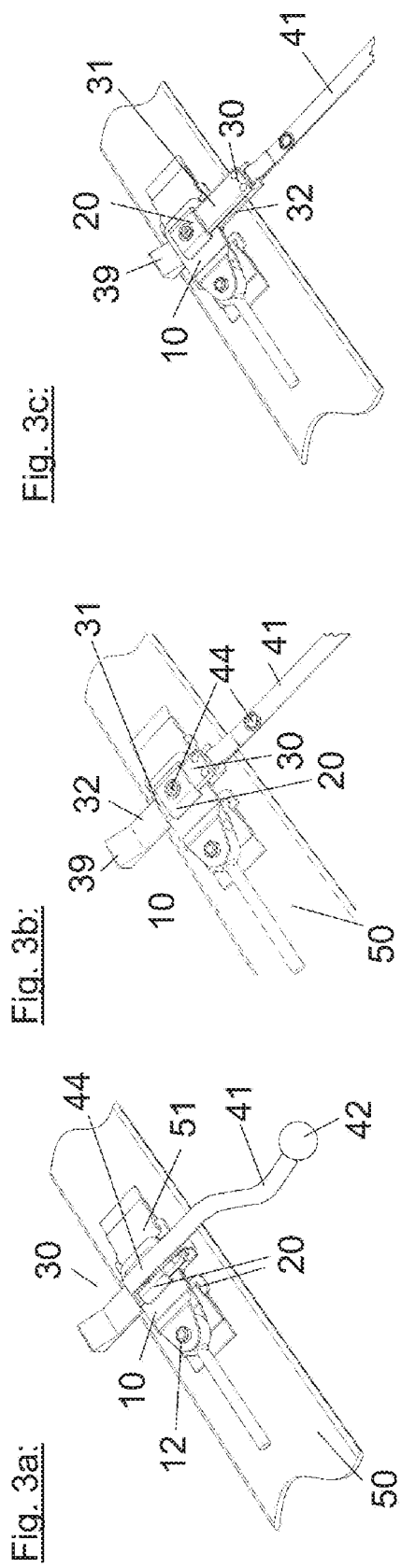

CONNECTION SYSTEM FOR CONNECTING LOADS TO A HARNESS

CROSS REFERENCE TO RELATED APPLICATIONS

This application claims priority to and the benefit of Europan Patent Application Number 18213219.1, filed 17 Dec. 2018, the disclosure of which is now expressly incorporated herein by reference.

FIELD OF THE DISCLOSURE

The present disclosure is concerned with a connection system for connecting loads to a belt harness.

In particular, this disclosure is concerned with a connecting system for connecting a sleigh or "pulka" to a belt harness. The load sleigh in particular is a boat-like constructed sleigh with a plastic trough, which today is also used as a transport sleigh for winter trekking tours and is pulled by the hiker himself. The belt harness is often connected to the sleigh with a pull rod instead of a rope connection. This ensures an improved directional stability of the sleigh and a controlled braking on steep slopes. The sleighs used for north and south pole expeditions often weigh well over 100 kg when loaded.

BACKGROUND

Belt harnesses are usually mounted at the body of humans and animals and serve for the load introduction to the body. The harnesses are therefore connected to another object, called load in the following. The load can, for example, be a parachute, a safety rope to protect against falling or a sleigh. Depending on the application, tie rods are also used to keep the load, for example the sleigh, at a distance, which is convenient on steep ground.

Carabiners are usually used as a detachable connection system between the pull rod of a sleigh and the belt harness. Releasing and attaching the carabiner is difficult or even impossible under arctic conditions with gloves on. This is aggravated by ice build-up, which surrounds and blocks the carabiner. Arctic areas under maritime influence mean massive icing tendency for the equipment. In any case, an actuation without eye contact or in the dark without practice is hardly possible.

It is therefore an object of the present disclosure to provide an improved connection system for connecting loads, in particular sleighs, to a belt harness, which allows a simplified, fast and safe handling, especially under icing conditions, line-of-sight obstruction and/or with gloves.

SUMMARY

An improved connection system for connecting loads, in particular sleighs, to a belt harness is provided by means of a connection system as described and claimed in this disclosure.

BRIEF DESCRIPTIONS OF THE DRAWINGS

Figure 2:
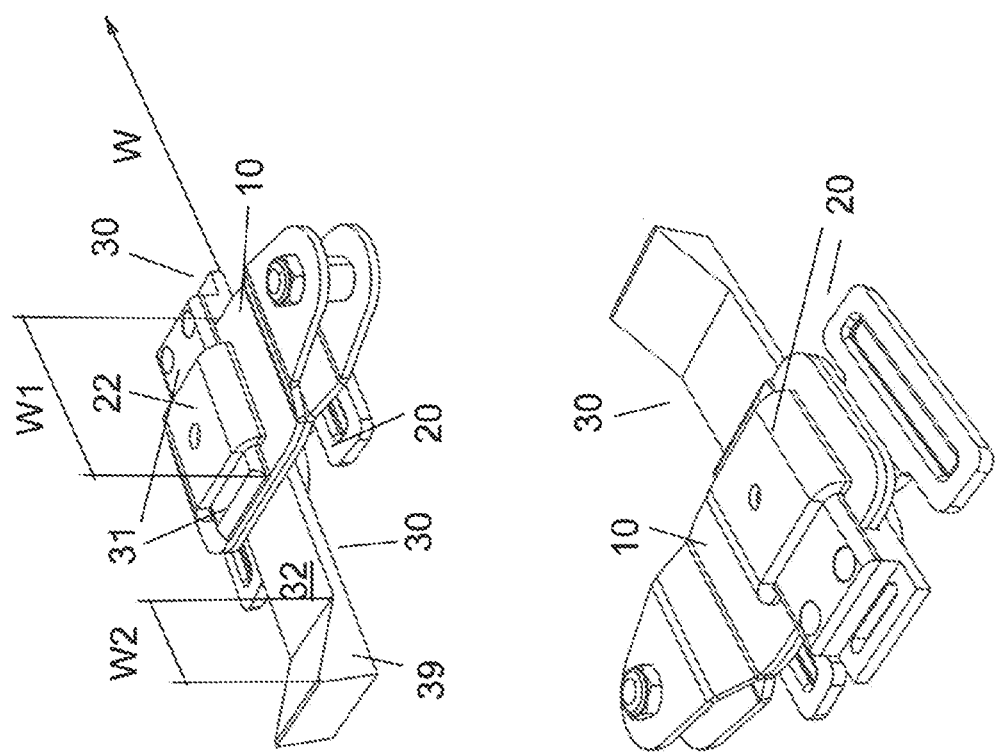
FIG. 2 is a perspective view of the load element of FIG. 1 showing the base element and the load element in a contact position and a closed position.

FIG. 3.a-3.e are a series of perspective views showing a separation process step by step using a preferred embodiment of the present disclosure;

FIG. 3a is a perspective view of a first step of the separation process;

FIG. 3b is a perspective view of a second step of the separation process;

FIG. 3c is a perspective view of a third step of the separation process;

FIG. 3d is a perspective view of a fourth step of the separation process; and

FIG. 3e is a perspective view of a fifth step of the separation process.

DESCRIPTION

The connection system according to the present disclosure for connection loads to a belt harness comprises a base element 20 with attaching means 21 for attachment to a belt harness 50. The latter can for example be a belt or a coupler with a coupler support frame holding the coupler in height. The belt can also comprise further functional elements, such as a Molle system, bags, flaps, etc., which are related to expeditions or military equipment. In any case, however, a base element 20 with attaching means 21 is required, which can be firmly connected to the belt via these, for example via straps 51 or loops. The base element 20 should be fixed firmly and stationary to the belt harness. For coupling and uncoupling a load, rather a separate load element 10 is provided.

For this purpose, this load element 10 first of all has connection means 12 for connecting a load, for example by means of a pull rod or a pull cable. Also here, it is provided that the load element remains at the load and that for coupling or decoupling of the belt harness from the load, the load element is rather connected or disconnected from the base element.

According to the present disclosure, it is initially provided that the base element 20 and the load element 30 are embodied in such a way that they can be brought into a contact position against one other. In doing so, first, the load element is at least partially fixed to the base element. In contrast to the carabiner connection described above, the base element 20 is only partially fixed to the load element 10 by means of a positive connection, first. It can therefore be released in at least one direction.

According to the present disclosure, this partial connection facilitates the operation of a movable locking element 30, which is intended for the complete fixing of the load element 10 already being in the contact position at the base element 20. In this contact position, the locking element 30 can be brought into a locking position relative to the base element and load element. In the locking position, the load element is completely positively locked to the base element and cannot fall off.

As another feature of the present disclosure the connection system is embodied in the form of a quick release system for separating the load element 10 from the base element 20 immediately from the closed position. It was recognized that to solve the problem of difficult handling under arctic conditions, the use of a quick release system leads to a simplification of handling, although here it is not primarily the speed of the release that matters, e.g. as in an emergency case. A quick release system means that the load element can be disconnected with a single hand movement.

In addition, the emergency release systems known from the state of the art are not suitable for separating and, if necessary, connecting load sleighs under arctic conditions:

There are emergency release systems known where the load can be separated from the harness by a controlled movement of the user. For example, for parachutists the belt harness can be opened by turning a lock and pressing the belt straps out of the lock housing by means of springs.

Additionally, cap interlocks are also known for parachutes to separate the parachute ropes from the belt harness in emergency situations. A quick and easy re-establishment of the connection is not possible and also not necessary for the purpose of an "emergency".

In connection with belts and straps, also fastening devices with a clip and at least one spring element, which is designed for locking engagement in a receptacle, are known. By compressing a certain point of the clip, these spring elements are compressed and release the catch mechanism. The two components do not disrupt by themselves, but a pull in the appropriate direction is necessary. Modifications have an additional ejection spring to separate the two components.

In addition, carabiners are known which comprise a hinged leg. This is held in a snap-in position by a spring pin. By pulling on the spring pin, usually via a short line attached to it, the snap-in position is canceled and the leg leaps up if a load pulls on it. Here, too, there are embodiments in which the leg leaps up in a spring-supported manner.

The emergency separation systems mentioned above have in common is that they are designed for emergency cases and are usually emanate on a certain load case, whereby the system to be disconnected is usually under tension or at least not under pressure. The detachable locking elements known from the state of the art all have one or more of the following disadvantages:

There are cavities where penetrated and then iced moisture prevents operation of the separation mechanism. This means that movement spaces are clogged by ice. Further, it may be that the ice prevents the buckle from being pulled apart because it is blocking the way.

If springs are provided as part of the locking mechanism or for active separation of the elements, their spring travel can also be hindered by infiltrated moisture that has been frozen there.

Spring steel is prone to frost fracture.

If the load to be disconnected presses on the lock, for example in the case of a pull rod there is no disconnection.

Especially in the case of the carabiner, its position in space is often not defined, so that in case of an emergency the line for the release mechanism must first be found, as well as the direction in which the release mechanism is to be pulled.

Quick release carabiners often do not release without load.

The connection system is therefore preferably designed in such a way that the load element 10 can be separated from the base element 20 by actuating the locking element 30 already with a single movement in one direction. If the user does not need to perform several steps for separation, a separation with line-of-sight obstruction and/or with gloves is facilitated.

In particular under icing conditions, the base element 20 and the load element 10 are preferably embodied in such a way that, to separate the load element 10 from the base element 20, the locking element 30 first is to be removed from the closed position. The load element would then no longer be completely fixed, but only in the contact position. Under favorable conditions, the load element could fall out of this position on its own and thus complete a separation. However, this does not happen if the load element is canted in the contact position by a pushing load, if it remains in the contact position due to an unfavorable position on the base element or if it is blocked by icing.

It is therefore a special feature of the present disclosure that by means of the locking element 30 the load element 10 can be pushed out of the contact position relative to the base element 20. Thus, the user first releases the locking position with a movement of the locking element and on its further way the locking element pushes the load element away from the base element. So, the user actively separates the elements by means of his force, even against resistances. In state-of-the-art emergency release systems, this function is usually performed by springs that are unreliable under the arctic conditions mentioned.

In the following, possible embodiments of this inventive concept are described, without being limited to the content of the figures:

Particularly for the attachment of load sleighs, it has been proven that the base element 20 and the load element 10 are designed in such a way that they are positively secured in the contact position in an X-Y plane X-Y against displacement in this X-Y plane. The user can therefore manually move the load element into a temporary position in which it is prevented from falling out, at least for a short time until it is completely fixed. The hand can even remain free, for example to press the locking element. Advantageously, the load element is movable in one direction of the Z-axis and not moveable in the opposite direction. The base element 20 and the load element 10 can be brought into contact position by moving the load element along the Z-axis in the direction of the base element 20. This corresponds, for example, to a lug positioned on a mandrel.

Preferably, the load element is already positively secured against rotation relative to the base element in the contact position around a Z-axis Z extending perpendicular to the X-Y plane. This corresponds, for example, to a plate with a rectangular recess which is pushed onto a correspondingly large rectangular profile. An anti-twist device has the advantage that the load element always has a defined position, even under compressive load. This ensures that the separation always takes place under the same initial geometrical conditions and, in the case of pull rods, prevents a physically incriminatory oscillating relative movement between load and belt when walking.

According to the present disclosure, to separate the load element from the base element, one after the other in one movement the locking position is released and then the two elements are forcibly separated, so pushed apart from each other. For this purpose, the locking element 30 is preferably designed in such a way that for separation the locking element 30 can be moved by a total path W in a defined direction in the X-Y plane. During its movement along this path W, in a first path section W1 the locking element 30 is moved out of the locked position. One could now move the elements apart. For the forced separation according to the present disclosure, however, in a second path section W2 the load element 10 is mechanically pushed/pressed out of the contact position relative to the base element 20 by the geometry 39 of the locking element 30 and thus forcibly separated.

The locking element therefore comprises a locking means 31 for complete locking and a separating means 39 for pushing apart the unlocked load element from the base element. It is essential here that the separating means do not act through spring force, but by force of the user.

In an advantageous embodiment which remains movable in particular under icing conditions, the locking element 30 comprises a locking means, in particular a latch 31, which in the contact position is guided into the base element 20 along the load element 10 so as to be pushable in and out. In doing so, establishing or canceling of the positive locking of the load element with the base element takes place. On the sides of the load element 10 and the base element 20, these form an opening 23 in the contact position, in and along which the locking means, in particular the latch 31, is guided in and out in a movable manner.

The purely mechanical, reliably operating and without any spring only by force of the user occurring forced separation preferably can be achieved by the section of the locking element which is designed as a separating means and which is in particular designed in the form of a wedge 39. If the user pulls the locking element with force, the load element is mechanically pressed out of the contact position relative to the base element by means of the wedge as it passes through the second path section W2.

A preferred embodiment of the locking element 30 comprises two strips 31,32 extending in the direction of the Z-axis Z one above the other and parallel to the X-Y plane X,Y, wherein one strip is forming the latch 31 and the second strip 32 comprises the wedge 39 rising in the direction of the Z-axis. This design is movable in a frozen state as well, at the latest after a few jerky attempts.

For this reason, the locking element 30 preferably consists of a material preventing ice accretion or at least has one such surface, preferably HDPE, plastics with a graphite portion and/or materials with additives preventing ice accretion.

If the load element 10, the base element 20 and the locking element 30 are designed such that a jerkily pull over at least the path W with the first and second path sections W1, W2 is sufficient for the complete triggering of the quick release system, a possibility is created for emergency release of a load, in particular a transport sleigh which can be triggered immediately and without operating errors even under the most adverse operational and arctic icing conditions. The sleigh can be completely separated in a fraction of a second. In many missions, it may be essential to remove the sleigh immediately and completely intuitively and safely, for example during avalanches or military operations under fire.

An even easier operation is achieved by an extended pulling means 41 on the locking element 30, which is easy to grip, especially with gloves. One only has to grip, for example, the strap 41 or the cord, which is easier to reach than the locking element.

If the extended pulling means 41 has a slip through stop 42 at its free end for hands, e.g. a knot, a thickening, a ball, etc., gripping, pulling and thus a separation from the load is ensured even without any tactile feeling with iced gloves.

To prevent accidental pulling of the extended pulling means, as well as unintentional sliding out of the locking element 30 out of the locking position, preferably a protection is provided to prevent accidental sliding out of the locking element 30. This holds the locking element in the locking position at the base element.

For this purpose, the extended pulling means or strap 41 preferably extends from the locking element 30 to the base element, load element or belt harness and is detachably connected there at a fastening point 44. Thereby, the extended pulling means 41 extends almost strained between the locking element 30 and the fastening point 44, so that the extended pulling means 41 prevent further slipping when the locking element initially slips.

Preferably, as a protection the extended pulling means, in particular the strap 41, as well as the base element, load element or belt harness are provided with detachable connecting means, in particular clickable push buttons 44, a magnetic connection or a hook-and-loop connection, at the fastening point. Beyond the fastening point, the free end 42 of the extended pulling means, e.g. the strap 41, attached to the fixing point hangs down flaccidly and can be gripped. This embodiment also has the advantage that the pulling means is held at a defined point at the body and is tangible. In addition, the emergency release is supported by a swinging, jerky hand movement, which may facilitate the release of icing: the free hanging end is gripped and pulled downwards. The protection is first overcome under slight resistance. On the further path of the hand, the strap is only pulled tight without force and therefore the hand picks up speed for then abruptly rips at the locking element 30 via the strap 41. Ice may flake off and the drive also ensures a powerful movement of the separating means or the wedge for the final push off of the load element.

The embodiment described below is easy to produce: The load element 10 is preferably a flat component with an inner flat recess 11 with a defined base area. The base element 20, which is a component with a through-opening 23 formed by a tunnel-like elevation 22, matches this, whereby the base area of the elevation 22 coincides with the base area of the flat recess 11 of the load element and the elevation fits into the flat recess. The contact position is given by inserting the elevation 22 into the flat recess 11. In this the tunnel-like elevation 22 of the base element protrudes above the load element 10. Then the upper part of the through-opening 23 lies above the load element 10 and it is possible to insert the movable latch 31 lying above the load element into this in order to assume the closed position.

Further, a belt harness, in particular with the connection system described, is claimed, the base element 20 being fastened to the belt harness with the attaching means 21 and wherein a load, in particular a sleigh, is connected to the load element 10 at the connecting means 12 via a pull rod or a pull cable, wherein a quick release system is provided.

The system of the present disclosure may include a base element (20) with fastening means (21) for fastening to a belt harness; a load element (10) with connecting means (12) for connecting a load, for example a load sleigh, in particular via a pull rod or a pull cable in which the base element (20) and the load element (30) are embodied such that they can be brought into a contact position against each another, in which the load element is partially fixed to the base element; a movable locking element (30) provided for completely fixing the load element (10) being in the contact position to the base element (20), wherein in the contact position, the locking element (30) can be brought into a closed position relative to the base element and load element, in which the load element is completely positively locked to the base element, and the connecting system is embodied in the manner of a quick release system, for separating the load element (10) from the base element (20) immediately from the closed position.

Finally, use of the described connection system for connecting and disconnecting a load sleigh from a belt harness attached to a person by means of a quick release system is claimed.

Figure 1:
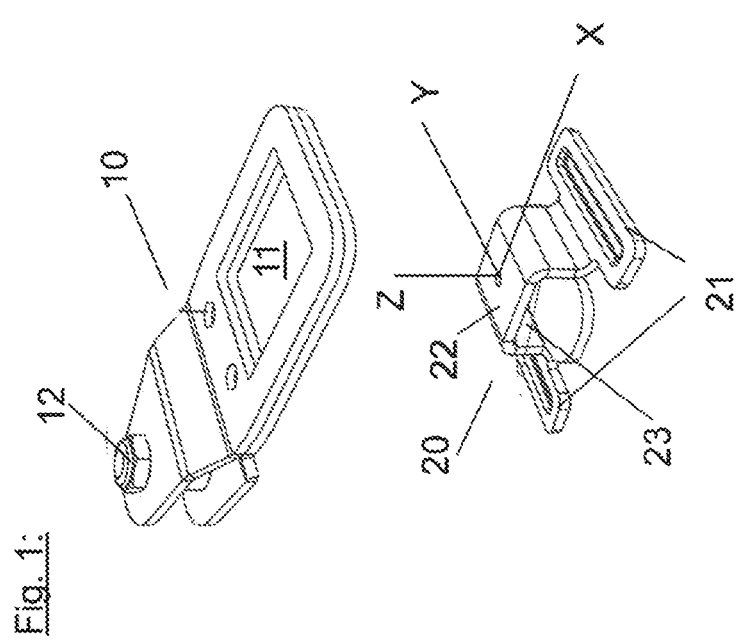
FIG. 1 is a perspective view of a load element associated with the present disclosure showing a base element with fastening means in the form of straps for fastening to a belt harness.

FIG. 1 shows a base element 20 with fastening means 21 in the form of straps for fastening to a belt harness. The base element 20 has a through opening 23 formed by a tunnel-like elevation 22.

Above a load element 10 with connecting means 12 in the form of a screw connection for connecting a load sleigh via a pull rod is floating. The load element 10 is a planar component with an inner planar recess 11 of a defined base area. Since the base area of the elevation 22 coincides with the base area of the flat recess 11 of the load element and the elevation fits into the flat recess, the contact position can be taken by inserting the elevation 22 into the flat recess 11. In the X-Y plane, the two components could not be rotated against each other and are therefore partially fixed.

FIG. 2 shows the base element 20 and the load element 30 not only in the contact position, but also in the closed position. Thereby, the movable locking element 30 is pushed into the upper part of the through opening 23 above the load element 10 with its latch 31. The through opening 23 is formed by the tunnel-like elevation 22 of the base element 20, which protrudes above the load element 10. Therefore, in the contact position, the upper part of the through opening 23 lies above the load element 10 and this part can be passed through by the latch 31 glidingly movable above the load element 10 in order to assume the closed position. In this position, the load element 10 can no longer be lifted upwards.

The connection system shown is embodied in the manner of a quick release system, and therefore the load element 10 can be separated from the base element 20 directly from the locked position by moving the movable locking element 30 in the direction of path W in the X-Y plane. When moving along path W, the locking element 30 is first pulled out of the locked position in a first path section W1. The latch 31 is then pulled out of the through opening 23 and completely releases the surface of the load element 10, which can therefore be lifted upwards in the Z direction.

In the subsequent second path section W2, however, the geometry 39 of the lower strip 32 of the locking element 30 causes the load element 10 to lift up and separate from the base element 20 from the contact position in a purely mechanical manner.

FIGS. 3.a-3.e explain the separation process step by step using a preferred embodiment.

FIGS. 3.a and 3b show the base element 20 and the load element 10 completely fixed in the closed position. The movable locking element 30 with its lower latch 31 is thereby pushed into the upper part of the through opening 23 of the base element 20 above the load element 10. The through opening 23 is formed by the tunnel-like elevation 22 of the base element 20, which protrudes above the load element 10. The load element 10 can no longer be lifted upwards.

To prevent accidental pulling of the extended pulling means as well as unintentional sliding out of the locking element 30 out of the locking position, preferably a protection is provided for preventing an accidental slipping of the locking element 30. This holds the locking element at the base element in the locking position.

For this purpose, the extended pulling means or strap 41 preferably extends from the locking element 30 to the base element, load element or belt harness and is detachably connected to it, there at a fastening point 44. Thereby, the extended pulling means 41 extends almost tightly between the locking element 30 and the fastening point 44, so that the extended pulling means 41 prevents further slipping in case of initial sliding of the locking element.

A flexible strap 41 extends from the lower end of the locking element 30 as extended pulling means, which is detachably connected to the fixing point of the base element 20 by means of a push-button connection 44. In FIG. 3.a, the free end of the strap 41 attached to the attachment point hangs down flabbily beyond the attachment point 44 and can be easily gripped as it is held at a defined point on the body. A ball 42 serves as a slip-through stop for hands. The strap 41 secures the locking element 30 against slipping out.

FIG. 3.b shows the beginning of the emergency release: The freely hanging end with ball 42 has already been gripped and pulled down. First, the push-button connection 44 is released under slight resistance. On the further way of the hand only the strap 41 is pulled tight without force and therefore the hand picks up speed for tearing jerkily by means of the strap at the locking element 30, then.

FIG. 3.c shows the first path that the locking element 30 travels under tension from the strap 41, thereby canceling the locking position. The latch 31 is then pulled out of the through opening 23 and then completely releases the surface of the load element 10, which can therefore be lifted upwards in the Z-direction. In FIG. 3.c, however, a small part of the bolt 31 still lies on a part of the load element, which is therefore not yet completely free. The wedge 39 on the lower strip 32 of the locking element 30 now already begins to lift and separate a part of the load element 10, although the locking position has not yet been completely released. Therefore, the first and second partial paths W1,W2 mentioned above may overlap partially.

In FIG. 3.d, the upper latch 31 has completely released the surface of the load element 10, which can now be set out. The wedge 39 supported this separation on the further path and lifted the load element 10 completely out of the contact position.

FIG. 3.e finally shows the complete separation of load and base element 10, 20. The locking element 30 remains in the base element 20, namely in the through-opening 23 of the elevation 22. The wedge 39 is too high and therefore cannot fall out of the through-opening 23.

The connection is made via a process in reverse order.

Exclusively for a better understanding of the present disclosure, reference signs are used within this description without restricting the disclosure to the content of the figures.

The invention claimed is:

1. A connection system for connecting and disconnecting loads to a belt harness, the connection system comprising
a base element having connection means for attachment to a belt harness; and
a load element with connecting means for connecting a load;
wherein the base element and the load element are designed such that they can be brought into a contact position against one another, the contact position characterized in that the load element is partially fixed to the base element;
wherein a movable locking element is provided for completely fixing the load element being in the contact position at the base element,
wherein in the contact position the locking element can be brought into a closed position relative to the base element and the load element, the closed position characterized in that the load element is completely positively locked to the base element, wherein the connecting system is configured to provide a quick release system for separating the load element from the base element immediately from the closed position, and wherein the base element and the load element are configured in such a way that, in the contact position, they are positively secured in an X-Y plane (X-Y) against displacement in this X-Y plane, and are positively secured against rotation about a Z axis (Z) extending perpendicular to the X-Y plane, and can be moved in one direction of the Z axis (Z) and cannot be moved in its opposite direction.

2. The connection system according to claim 1, wherein the connection system is configured such that that the load element can be separated from the base element by actuating the locking element by means of a single movement in one direction.

3. The connection system according to claim 1, wherein the base element and the load element are configured such that, in order to separate the load element from the base element, the locking element can be brought out of the closed position and, furthermore the load element can be pressed out of the contact position relative to the base element by means of the locking element.

4. The connection system according to claim 1, wherein the base element and the load element are configured such that the base element and the load element can be brought into the contact position by moving the load element along the Z-axis in direction towards the base element.

5. The connection system according to claim 1, wherein the locking element comprises a locking means for completely locking the load element with the base element in the closed position and a separating means for pushing apart and unlocking the load element from the base element.

6. The connection system according to claim 1, wherein the locking element is embodied such that for separating the load element from the base element, the locking element can be moved by a path (W) in a defined direction in the X-Y plane, wherein during its movement along the path (W) in a first path section (W1) the locking element is brought out of a locked position, and further in a second path section (W2) a geometry of the locking element mechanically pushes out and therefore separates the load element relative to the base element out of the contact position.

7. The connection system according to claim 6, wherein that a portion of the locking element is designed as a separating means, which, when passing through the second path section (W2) of the locking element, mechanically lifts the load element out of the contact position relative to the base element.

8. The connection system according to claim 6, wherein the load element, the base element and the locking element are embodied such that for a complete triggering of the quick release system a jerkily pulling over at least the path (W) of the first and second path sections (W1, W2) is sufficient, and wherein an extended pulling means is provided at the locking element having a slip-through stop for hands;

wherein a protection is provided for preventing the locking element from accidental slipping, which holds the locking element in the closed position at the base element, and wherein the extended pulling means is detachably connected with the base element, the load element or the belt harness at a fastening point, so that in case of initial slipping of the locking element, the extended pulling means prevent further slipping.

9. The connection system according to claim 8, wherein the extended pulling means as well as the base element, the load element or the belt harness each comprise detachable connection means, so that in case of initial slipping of the locking element, the extended pulling means prevent further slipping.

10. The connection system according to claim 1, wherein the locking element comprises a locking means including a latch which in the contact position is guided into the base element along the load element so as to be pushable in and out for establishing and canceling a positive locking of the load element with the base element and wherein the load element and the base element form an opening in the contact position, in which and along which the locking means, in particular the latch, is guided so as to be pushable in and out.

11. The connection system according to claim 1, wherein the locking element comprises two strips which extend in the direction of the Z axis (Z) one above the other and parallel to the X-Y plane (X, Y), one strip forming a latch and a second strip having a wedge which rises in the direction of the Z axis.

12. The connection system according to claim 1, wherein the locking element consists of a material configured to prevent ice accretion HDPE, plastics with a graphite portion.

13. The connection system according to claim 1, wherein the load element is a planar component having an inner planar recess of a defined base area;

wherein the base element is a component having a through opening formed by a tunnel-like elevation, wherein the base element are of the elevation coincides with the base element are of the planar recess of the load element and the elevation fits into the planar recess;

wherein the contact position is given by inserting the elevation into the planar recess; and wherein in the contact position the tunnel-like elevation of the base element protrudes above the load element, so that an upper part of the through opening lies above the load element and this can be passed through by a latch movable above the load element in order to assume the closed position.

14. A connection system for connecting and disconnecting loads to a belt harness, the connection system comprising a base element having connection means for attachment to a belt harness; and a load element with connecting means for connecting a load;

wherein the base element and the load element are designed such that they can be brought into a contact position against one another, the contact position characterized in that the load element is partially fixed to the base element;

wherein a movable locking element is provided for completely fixing the load element being in the contact position at the base element, wherein in the contact position the locking element can be brought into a closed position relative to the base element and the load element, the closed position characterized in that the load element is completely positively locked to the base element, wherein the connecting system is configured to provide a quick release system for separating the load element from the base element immediately from the closed position, and wherein the locking element consists of a material configured to prevent ice accretion HDPE, plastics with a graphite portion.

15. A connection system for connecting and disconnecting loads to a belt harness, the connection system comprising
a base element having connection means for attachment to a belt harness; and
a load element with connecting means for connecting a load;
wherein the base element and the load element are designed such that they can be brought into a contact position against one another, the contact position characterized in that the load element is partially fixed to the base element;
wherein a movable locking element is provided for completely fixing the load element being in the contact position at the base element,
wherein in the contact position the locking element can be brought into a closed position relative to the base element and the load element, the closed position characterized in that the load element is completely positively locked to the base element,
wherein the connecting system is configured to provide a quick release system for separating the load element from the base element immediately from the closed position,
wherein the load element is a planar component having an inner planar recess of a defined base area,
wherein the base element is a component having a through opening formed by a tunnel-like elevation, wherein the base element are of the elevation coincides with the base element are of the planar recess of the load element and the elevation fits into the planar recess,
wherein the contact position is given by inserting the elevation into the planar recess, and
wherein in the contact position the tunnel-like elevation of the base element protrudes above the load element, so that an upper part of the through opening lies above the load element and this can be passed through by a latch movable above the load element in order to assume the closed position.

* * * * *